US008824336B2

(12) United States Patent
Jing et al.

(10) Patent No.: US 8,824,336 B2
(45) Date of Patent: Sep. 2, 2014

(54) METHOD AND APPARATUS FOR A WIRELESS HOME MESH NETWORK WITH NETWORK TOPOLOGY VISUALIZER

(75) Inventors: Xiangpeng Jing, San Diego, CA (US); Abhishek Patil, San Diego, CA (US); Anuj Bhatnagar, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 184 days.

(21) Appl. No.: 13/191,328

(22) Filed: Jul. 26, 2011

(65) Prior Publication Data
US 2011/0280156 A1 Nov. 17, 2011

Related U.S. Application Data

(63) Continuation of application No. 12/402,413, filed on Mar. 11, 2009, now Pat. No. 7,990,897.

(51) Int. Cl.
*H04W 80/04* (2009.01)
*H04W 88/06* (2009.01)

(52) U.S. Cl.
USPC .......................................... 370/255; 370/328

(58) Field of Classification Search
CPC ....... H04L 41/12; H04L 45/02; H04W 80/04; H04W 88/06
USPC .......................................... 370/254, 255, 328
See application file for complete search history.

(56) References Cited

U.S. PATENT DOCUMENTS

| 4,890,323 | A | 12/1989 | Beker et al. |
| 5,303,388 | A * | 4/1994 | Kreitman et al. ............. 715/836 |
| 6,581,166 | B1 | 6/2003 | Hirst et al. |
| 6,842,460 | B1 | 1/2005 | Olkkonen et al. |
| 6,879,574 | B2 | 4/2005 | Naghian et al. |
| 7,042,988 | B2 | 5/2006 | Juitt et al. |
| 7,069,483 | B2 | 6/2006 | Gillies et al. |
| 7,092,715 | B2 | 8/2006 | Korpela et al. |
| 7,184,767 | B2 | 2/2007 | Gandolfo |
| 7,366,113 | B1 * | 4/2008 | Chandra et al. ............... 370/255 |
| 7,403,492 | B2 | 7/2008 | Zeng et al. |

(Continued)

FOREIGN PATENT DOCUMENTS

| EP | 1912147 | 4/2008 |
| KR | 100499122 | 7/2005 |

(Continued)

OTHER PUBLICATIONS

"United States Patent and Trademark Office—Non-Final Office Action Dated Aug. 24, 2010", U.S. Appl. No. 12/402,413.

(Continued)

*Primary Examiner* — Ronald Abelson
(74) *Attorney, Agent, or Firm* — John L. Rogitz

(57) ABSTRACT

An apparatus and method for a wireless home mesh network with a network topology visualizer is described. In one embodiment, the method may include collecting node topology information by a node of a wireless home mesh network, where the node topology information includes a list of neighbor nodes for the node. Thereafter, a communication socket is opened, and a node topology packet, including a lust of neighbor nodes, is transmitted in order to produce a global network topology map. Other embodiments are described and claimed.

19 Claims, 7 Drawing Sheets

(56) References Cited

U.S. PATENT DOCUMENTS

| | | |
|---|---|---|
| 7,408,911 B2 | 8/2008 | Joshi |
| 7,443,809 B2 | 10/2008 | Bajic |
| 7,505,751 B1 | 3/2009 | Backes |
| 7,554,998 B2 | 6/2009 | Simonsson et al. |
| 7,586,888 B2 | 9/2009 | Wang |
| 7,623,501 B2 | 11/2009 | Rangarajan et al. |
| 7,822,064 B2 | 10/2010 | Thubert et al. |
| 7,961,674 B2 | 6/2011 | Jing et al. |
| 7,990,897 B2 | 8/2011 | Jing et al. |
| 8,116,336 B2 | 2/2012 | Jing et al. |
| 8,130,704 B2 | 3/2012 | Jing et al. |
| 2003/0040945 A1* | 2/2003 | Fujita et al. .................. 705/5 |
| 2004/0103295 A1 | 5/2004 | Gustafsson |
| 2004/0174900 A1 | 9/2004 | Volpi et al. |
| 2004/0174904 A1 | 9/2004 | Kim et al. |
| 2004/0233855 A1 | 11/2004 | Gutierrez et al. |
| 2004/0235468 A1 | 11/2004 | Luebke et al. |
| 2004/0249817 A1 | 12/2004 | Liu et al. |
| 2005/0113070 A1 | 5/2005 | Okabe |
| 2005/0138359 A1 | 6/2005 | Simon |
| 2005/0201393 A1 | 9/2005 | Hatayama et al. |
| 2005/0250473 A1 | 11/2005 | Brown et al. |
| 2006/0028999 A1* | 2/2006 | Iakobashvili et al. ......... 370/252 |
| 2006/0088034 A1* | 4/2006 | Santitoro ................. 370/395.21 |
| 2006/0094401 A1 | 5/2006 | Eastlake |
| 2006/0161778 A1 | 7/2006 | Stirbu et al. |
| 2006/0171540 A1 | 8/2006 | Lee et al. |
| 2006/0215593 A1 | 9/2006 | Wang et al. |
| 2006/0256733 A1* | 11/2006 | Bejerano .................. 370/254 |
| 2006/0268933 A1* | 11/2006 | Kellerer et al. ............. 370/469 |
| 2007/0002742 A1* | 1/2007 | Krishnaswamy et al. .... 370/235 |
| 2007/0018984 A1* | 1/2007 | Sauvageau .................. 345/440 |
| 2007/0050129 A1* | 3/2007 | Salmre ........................ 701/207 |
| 2007/0053299 A1* | 3/2007 | Khan et al. .................. 370/238 |
| 2007/0081543 A1 | 4/2007 | Brenes et al. |
| 2007/0104215 A1 | 5/2007 | Wang et al. |
| 2007/0127503 A1 | 6/2007 | Zhao |
| 2007/0147241 A1 | 6/2007 | Wang et al. |
| 2007/0178884 A1 | 8/2007 | Donovan et al. |
| 2007/0195702 A1 | 8/2007 | Yuen et al. |
| 2007/0200914 A1 | 8/2007 | Du Mas |
| 2007/0230438 A1* | 10/2007 | Jayapalan et al. ............ 370/352 |
| 2007/0254677 A1 | 11/2007 | Venkitaraman et al. |
| 2008/0037442 A1 | 2/2008 | Bill |
| 2008/0039130 A1 | 2/2008 | Acampora |
| 2008/0108356 A1* | 5/2008 | Tamura et al. .............. 455/445 |
| 2008/0112363 A1 | 5/2008 | Rahman et al. |
| 2008/0112371 A1 | 5/2008 | Joshi |
| 2008/0227462 A1 | 9/2008 | Freyman et al. |
| 2009/0022115 A1 | 1/2009 | Berzin et al. |
| 2009/0067840 A1* | 3/2009 | Bernard et al. ................ 398/67 |
| 2009/0147702 A1 | 6/2009 | Buddhikot et al. |
| 2009/0213824 A1 | 8/2009 | Chen |
| 2009/0303902 A1 | 12/2009 | Liu et al. |
| 2009/0303921 A1 | 12/2009 | Manchanda et al. |
| 2010/0080200 A1 | 4/2010 | Stewart |
| 2010/0083303 A1 | 4/2010 | Redei et al. |
| 2010/0118727 A1* | 5/2010 | Draves et al. ................ 370/252 |
| 2010/0188971 A1 | 7/2010 | Chiang |
| 2010/0189011 A1 | 7/2010 | Jing et al. |
| 2010/0189029 A1* | 7/2010 | Jing et al. .................... 370/328 |
| 2010/0191968 A1 | 7/2010 | Patil et al. |
| 2010/0202345 A1 | 8/2010 | Jing et al. |
| 2010/0271945 A1 | 10/2010 | Clave et al. |
| 2010/0275244 A1* | 10/2010 | Lor et al. ..................... 726/3 |
| 2010/0283579 A1 | 11/2010 | Kraus et al. |
| 2011/0021150 A1 | 1/2011 | Lin |
| 2011/0211565 A1 | 9/2011 | Jing et al. |
| 2011/0211566 A1 | 9/2011 | Jing et al. |

FOREIGN PATENT DOCUMENTS

| | | |
|---|---|---|
| WO | 2004017552 | 2/2004 |
| WO | WO-2004017552 | 2/2004 |
| WO | WO-2005109754 | 2/2005 |
| WO | 2005109754 | 11/2005 |
| WO | WO-06098723 | 9/2006 |
| WO | 2008002718 | 1/2008 |
| WO | WO-2008002718 | 1/2008 |

OTHER PUBLICATIONS

International Search Report and Written Opinion of the International Searching Autority Dated Aug. 5, 2010, International Application No. PCT/US2010/021082.

United States Patent and Trademark Office—Non-Final Office Action Dated Aug. 19, 2010, U.S. Appl. No. 12/360,821.

United States Patent and Trademark Office—Non-Final Office Action Dated Jan. 20, 2011, U.S. Appl. No. 12/791,386.

"United States Patent and Trademark Office—Final Office Action Dated Jun. 24, 2011", U.S. Appl. No. 12/791,386.

Auto IP Collision Detection and Resolution for Multi-Hop Sony Mesh Network with Link Failures (Sony Electronics Proprietary) 1 page.

Auto IP Slide Show (Sony Electronics Proprietary) 5 pages.

PCT/US2010/021082 Notification Concerning Transmittal of International Preliminary Report on Patentability (Chapter 1 of the Patent Cooperation Treaty); Date of mailing Aug. 11, 2011.

International Search Report and Written Opinion of the International Searching Authority Dated Oct. 12, 2010, International Application No. PCT/US2010/023242.

International Search Report and Written Opinion of the International Searching Authority Dated Aug. 23, 2010, International Application No. PCT/US2010/021685.

"United States Patent and Trademark Office—Office Action Dated Oct. 4, 2011", U.S. Appl. No. 12/367,184.

Benveniste, Mathilde , "Express Forwarding: A Distributed QoS MAC Protocol for Wireless mesh", *MESH 2008, CAP Esteral*, France.

Ellison, Carl M., :"Home Security" *Intel Technology Journal*, Nov. 12, 2002, vol. 6, issue 4, pp. 37-48, ISSN 1535-766X. See pages 39, 41-42,46-47.

Hong, et al., "A Base-station Centric Data Gathering Routing Protocol in Sensor Networks Useful in Home Automation Applications," *IEEE Transactions on Consumer Electronics*, vol. 53, Issue 3, Aug. 2007, pp. 945-951 (Abstract only, 1 page).

Hubaux, Jean-Pierre , *Peer-to-Per security Wireless in Ad Hoc Networks* pp. 1-45, EPFL—Eroffnungskolloquium des Sonderforschungsbereich 627 Nexus, htt://LCAWWW.epfl.ch/hubaux/Talks/Stuggart.ppt.

Johnson, et al., "DSR: The Dynamic Source Routing Protocol for Multi-Hop Wireless Ad Hoc Networks", *Ad Hoc Networking*, Charles Perkins, ed., Chapter 5, pp. 139-172, Addison-Wesley, 2001.

Naouel, Ben S., et al., "Secure Wireless Mesh Networks", *Laboratory of Computer Communications and Applications (LCA)* Apr. 6, 2006, pp. 1-1-(4), EPFL—Lausanne, Switzerland, http://www.ele.uri.edu/next/readinglist/Securing_Wireless_Mesh_Networks.pdf.

Peng, et al., "A Wireless MAC Protocol with Collision Detection", *IEEE Transactions on Mobile Computing*, vol. 6, No. 12, Dec. 2007, pp. 1357-1369.

Shai, Halevi , et al., "Public-Key Cryptography and Password Protocols." *ACM Transactions on Information and System Security*, Aug. 1999, vol. 2, No. 3, pp. 230-268, See figs. 1-2, and pp. 239-242.

Souryal, Michael R., et al., "Real-Time Deployment of Multihop Relays for Range Extension", *Wireless Communication Technologies Group, National Institute of Standards and Technology*, Gaithersburg, MD, US, 2007 copyright Association for Computing Machinery, pp. 85-98.

Tang, Helen , et al., "Strong Authenticiation for Tactical Mobile Ad Hoc Networks", Jul. 2007, pp. 1-53, *Defence R&D Cananda—Ottawa: Technical Memorandum DRDC* Ottawa TM 2007-146.

Shai Halevi et al. "Public-Key Cryptography and Password Protocols." ACM Transactions on Information and System Security, Aug. 1999, vol. 2,No. 3, pp. 230-268 See figs. 1-2 and pp. 239-242.

Carl M. Ellison, "Home Security." Intel Technology Journal, Nov. 12, 2002, vol. 6, Issue 4, pp. 37-48, ISSN 1535-766X. See pp. 39, 41-42, 46-47.

(56) References Cited

OTHER PUBLICATIONS

"International Search Report and Written Opinion of the International Searching Authority Dated Aug. 5, 2010", International Application No. PCT/US2010/021082.

Naouel Ben Salem et al., "Secure Wireless Mesh Networks", Laboratory of Computer Communications and Applications (LCA), Apr. 6, 2006, pp. 1-10 (4), EPFL—Lausanne, Switzerland, http://www.ele.uri.edu/nest/readinglist/Securing_Wireless_Mesh_Networks.pdf.

Helen Tang et al., "Strong Authentication for Tactical Mobile Ad Hoc Networks", Jul. 2007, pp. 1-53, Defence R & D Canada—Ottawa: Technical Memorandum DRDC Ottawa TM 2007-146.

Jean-Pierre Hubaux, "Peer-to Peer Security in Wireless Ad Hoc Networks", Nov. 25, 2003, pp. 1-45, EPFL—Eroffnungskolloquium des Sonderforschungsbereich 627 Nexus, http://lcawww.epfl.ch/hubaux/Talks/Stuttgart.ppt.

Hong, et al. "A Base-station Centric Data Gathering Routing Protocol in Sensor Networks Useful in Home Automation Applications," IEEE Transactions on Consumer Electronics, vol. 53, Issue 3, Aug. 2007, pp. 945-951 (Abstract only, 1 page).

"United States Patent and Trademark Office—Non-Final Office Action Dated Jan. 20, 2011", U.S. Appl. No. 12/791,386.

Souryal, et al. "Real-Time Deployment of Multihop Relays for Range Extension", Wireless Communication Technologies Group, National Institute of Standards and Technology, Gainsburg, Maryland, USA, 2007, ACM 978-1-59593-614-1/07/0006, pp. 85-98.

U.S. Appl. No. 12/367,184, Non-Final Office Action, mailed May 4, 2012.

U.S. Appl. No. 12/360,771, Non-Final Office Action, mailed Mar. 9, 2012.

Office Action for Japanese application JP 2011-548033 dated May 14, 2013 (with English translation).

Halevi, Shai et al., "Public-Key Cryptography and Password Prtocols", ACM Transactions on Information and System Security, vol. 2, No. 3, Aug. 1999, pp. 230-268.

Aljindi, Mohamad et al., "Autonomic Security for Home Networks", First International Workshop, IWSOS 2006 and Third International Workshop on New Trends in Network Architectures and Services, EuroNGI 2006 Passau, Germany, Sep. 2006, Proceedings.

United States Patent and Trademark Office—Office Action (U.S. Appl. No. 13/102,976) dated Mar. 7, 2013.

United States Patent and Trademark Office—Office Action (U.S. Appl. No. 12/360,771 dated Aug. 10, 2012.

Office Action dated Aug. 13, 2013 for U.S. Appl. No. 13/102,976.

Office Action dated Jul. 30, 2013 for U.S. Appl. No. 13/102,974.

\* cited by examiner

METHOD AND APPARATUS FOR A WIRELESS HOME MESH NETWORK WITH NETWORK TOPOLOGY VISUALIZER

CROSS-REFERENCE TO RELATED APPLICATIONS

This application is a continuation which is based upon and claims the benefit of priority from U.S. patent application Ser. No. 12/402,413, filed Mar. 11, 2009.

FIELD

The invention relates generally to the field of wireless device connectivity. More particularly, one or more of the embodiments of the invention relate to a method and apparatus for a wireless home mesh network with a network topology visualizer.

BACKGROUND

A wireless network provides a flexible data communication system that can either replace or extend a wired network. Using radio frequency (RF) technology, wireless networks transmit and receive data over the air through walls, ceilings, and cement structures without wired cabling. For example, a wireless local area network (WLAN) provides all the features and benefits of traditional LAN technology, such as Ethernet and Token Ring, but without the limitations of being tethered together by a cable. A WLAN can provide greater freedom and increased flexibility than traditional wired networks.

Currently, a wireless network operating in accordance with the Institute of Electrical and Electronic Engineers (IEEE) 802.11 Standard (e.g., IEEE Std. 802.11a/b/e/g/n/s) may be configured in one of two operating modes: infrastructure mode; and ad hoc mode. As of today, most installed wireless networks are configured and operate in infrastructure mode—where one or more access points (APs) are configured as interfaces for a wired distribution network (e.g., Ethernet). In infrastructure mode, mobile devices with wireless connectivity (e.g., laptop computer with a radio network interface card "NIC") are able to establish communications with the AP; the users of these devices access content within servers connected to the wired network.

As an optional feature, however, the IEEE 802.11 Standard specifies "ad hoc" mode, which allows the radio NIC within each wireless device to operate in an independent basic service set (IBSS) network configuration. In ad hoc mode, the wireless devices perform peer-to-peer communications with each other instead of utilizing the AP for supporting such wireless communications. The ad hoc mode also allows users to spontaneously form a wireless LAN. For example, a group of employees (with laptops implemented with IEEE 802.11 wireless chipsets) may gather at a coffee house and form a small WLAN by switching their NICs to ad hoc mode. As a result, the employees could share presentation charts and spreadsheets without the need for cabling.

One type of ad hoc network is referred to as a mesh network, which allows for continuous connections and reconfiguration around broken or blocked paths by "hopping" from device to device until a destination is reached. Mesh networks differ from other networks; in a mesh network, the devices can all connect to each other via multiple hops without an infrastructure (e.g., an AP), and these devices can be mobile or stationary. Related to mesh networks, mobile ad-hoc networks (MANETs) are self-configuring networks of mobile routers, where the routers are free to relocate.

One of the primary advantages of mesh networks (and MANETs) is their ability to extend the range of the wireless network. For example, a user on one side of the building can send a packet destined to another user on the far side of the facility, well beyond the point-to-point range of IEEE 802.11-compliant AP, by having the radio signal hop from one mobile device to mobile device until the radio signal reaches a targeted destination. This can extend the range of the WLAN from hundreds of feet to miles, depending on the concentration of wireless users.

With recent technology advances in integrated circuits, and breakthroughs in multiple input and multiple output (MIMO) systems, wireless digital communications entered a new era of faster speed wireless networking applications. Mobile devices such as smart phones, music/movie players, personal digital assistants, gaming devices and the like, are creating a demand for new wireless communication and networking technologies to allow seamless connection of wireless mobile devices.

SUMMARY

One disclosed feature of the embodiments provides a method and apparatus for a wireless home mesh network with quality of service. The method includes formation of a wireless home networking environment that seamlessly interconnects various proprietary devices to provide a wireless plug and play experience. A wireless home mesh network is described that improves existing home network performance for better range/rate and interconnection with outdoor wireless networks. Home (consumer) electronics devices may be classified according to a multi-tier system, comprising a collection of nodes that operate as a decentralized, wireless home mesh network with multiple (N≥1) sub-networks (hereinafter referred to as "tiers") that are responsible for different functions within the network. Each node of the multi-tier wireless network is assigned to a particular tier based on the node's performance capabilities, and is configured to forward data to other nodes.

In one embodiment, a hierarchical architecture is described where different functions can be implemented for stationary and mobile nodes in the network. In one embodiment, using the various available home electronic devices, these devices may be organized as nodes of a wireless home mesh network. For example, a first tier of the network may resemble a traditional Internet connection (via a cable/DSL connection, or 3G/WiMax outdoor mesh). The node directly connected to the Internet may be referred to as a gateway node and there may be multiple gateway nodes in a home network. A second tier of the network represents the backhaul of the network that interconnects various stationary (fixed-location) consumer electronics (CE) devices (e.g., flat-panel TVs, PlayStations, or desktop computers) that are usually stationary and electrically coupled to a power supply (non-power constrained). A third tier of the network may include links between a device belonging to the second tier of the network and low-powered, resource-constrained mobile CE devices (e.g., laptops, cellular phones, PDAs, etc.).

In a further embodiment, the method may include displaying the network topology of a wireless home mesh network. The mobile nodes and stationary nodes of the wireless home mesh network may wirelessly communicate to share topology information regarding the wireless home mesh network. The topology information may include local connectivity information of a node, such as the direct neighbors of the node and the neighbors' neighbor information. In one embodiment, the local connectivity information is compiled to form an interactive global topology map of the wireless home mesh network to display for a user.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the disclosed features of various described embodiments.

System Architecture

In the following description, certain terminology is used to describe certain features of the invention. For instance, the term "wireless node" is generally defined as a device with data processing and wireless communication capabilities. The term "logic" is generally defined as hardware and/or software configured to perform one or more functions. One example of a certain type of logic is a wireless chipset, being one or more integrated circuits, operating to request access to a wireless network and/or authenticate a wireless node before granting the node access to the wireless network. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images, data files, or any combination thereof.

Figure 1:
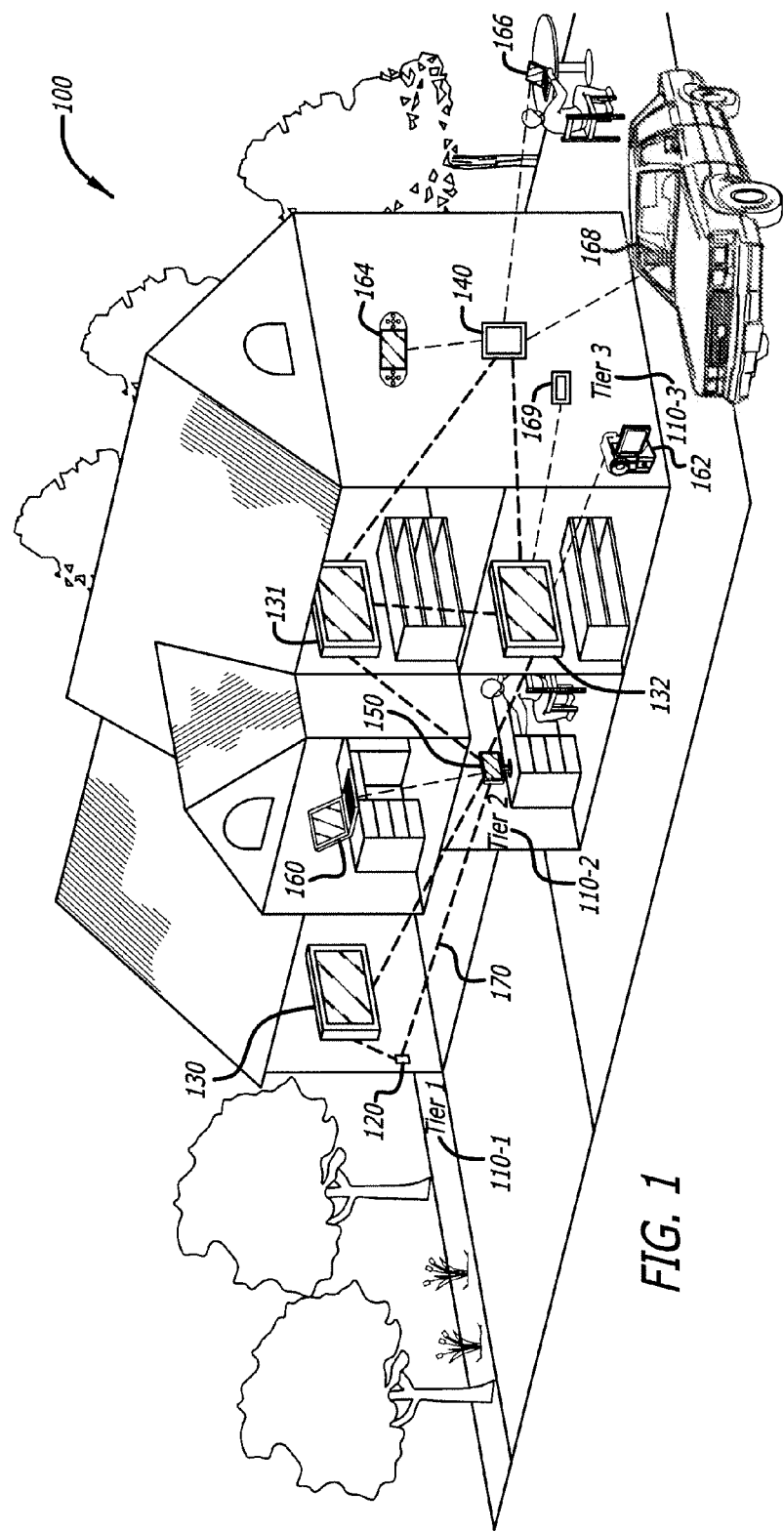
FIG. 1 is a block diagram illustrating a three-tier wireless ad hoc home network, according to one embodiment.

Referring to FIG. 1, an exemplary embodiment of a multi-tier wireless home mesh network 100 is described. Multi-tier wireless home mesh network 100 (hereinafter referred to as "home network" or "WHMN" 100) comprises a collection of nodes that operate as a decentralized, wireless home mesh network with multiple (N≥1) sub-networks $110_1$-$110_N$ (hereinafter singularly referred to as "tiers") that are responsible for different functions within home network 100. Hence, mostly every node of home network 100 is configured to forward data to other nodes and is assigned to a different tier based on its performance capabilities and power constraints. The assignment of a node to a tier is based on performance capabilities of the node; routing decisions are made by the nodes based on the network connectivity and the ability to forward data by that particular node.

During network deployment phase, it is important to compile the global topology information of the multi-hop mesh network. As described herein, global topology information may include node connectivity information, node status information, and other like node details. However, due to its ephemeral nature (i.e. without infrastructure), it is difficult to get a complete picture of the overall network topology. One embodiment describes a mesh visualizer to collect network global information and display the network topology. In one embodiment, a mesh visualizer is a stand-alone tool (or service) designed to collect global topology information. With the visualizer tool, users can access a real-time topology of the network connectivity and detailed information of each node, device, or link. In one embodiment, an interactive global topology map provides a useful tool for network engineers or testers during wireless development and debugging. With such a visualizer tool, a developer, tester, or end user can gather details about the network, including network failures, dead spots, or connectivity status, and the like.

Referring again to FIG. 1, one embodiment of home network 100 features a hierarchical architecture comprising three (3) tiers that are assigned based on the capabilities of the node. A first tier ("tier 1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within home network 100 in order to provide multiple communication paths to external network(s).

A second tier ("tier 2") $110_2$ of home network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronics device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary wireless nodes are not subject to power constraints that are usually present in mobile wireless nodes where power usage is minimized to extend battery life between recharges.

Referring still to FIG. 1, a third tier ("tier 3") $110_3$ of home network 100 may include links between a wireless node belonging to second tier $110_2$ and one or more mobile nodes (160-169). A "mobile electronics device" or "mobile wireless node" may include any battery powered electronics device with wireless connectivity including, but not limited to, a laptop computer, handheld device (e.g., personal digital assistant, ultra mobile device, cellular phone, portable media player, wireless camera, remote control, etc.) or the like non-stationary consumer electronics devices. Since mobile wireless nodes normally have resource constraints (e.g., limited power supplies, limited processing speeds, limited memory, etc.), third tier $110_3$ may provide reduced network services. In one embodiment, mobile wireless nodes of home network 100 may act as a slave or child connecting directly to a tier 2 node, which may further limit their functionality within home network 100.

Below, Table 1 summarizes a multi-tier, wireless home mesh network architecture, categorization by potential network characteristics, tier node descriptions and traffic type that is prevalent over home network 100.

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, . . . |
| | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
| | Tier 2 | Fixed location, power-sufficient (TX power 100 mW-1 W) | TV, desktop computer, gaming console (e.g. PS3), etc. |
| | Tier 3 | Mobile, power-limited (TX power 1-100 mW) | Laptop, mobile phone, portable media player, wireless camera, remote |
| Traffic | HD video streaming | ~30Mbps compressed | 1080 p/i, 720 p/i, 480 p/i quality HD videos |
| | SD Video/Audio streaming | ~100 k-1 Mbps video, 32 k-256 kbps audio | Internet video clip (e.g. YouTube), webcam output, mp3 audio, voice |
| | Data | Bursty transmission, ~20 Mbps for certain user satisfaction | http type data (web browsing) |

As indicated by Table 1, home network 100 is distinct from conventional mesh-network solutions because home network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the home network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

As indicated by the various traffic described in Table 1, one embodiment of a wireless home mesh network is targeted toward TV-centric home scenarios where fixed-location and mobile devices are connected by a TV-based network architecture, for example as shown in FIG. 1. As the media center of a home, most traffic traversing through the fixed-location devices is video: 1080p/I, 720p/I, 480p/I and SD quality video. When a fixed-location device is connected to the Internet, it competes with the Internet-based traffic present in the mesh network; namely, premium video content (usually HD quality), small video clips and web data. By distinguishing between various types of traffic and assigning different priorities using QoS, a wireless home mesh network is able to meet requirements of the media content to provide a guaranteed QoS level. Real-time information for accessing link quality may be provided by a mesh visualizer, according to one embodiment.

Figure 2:
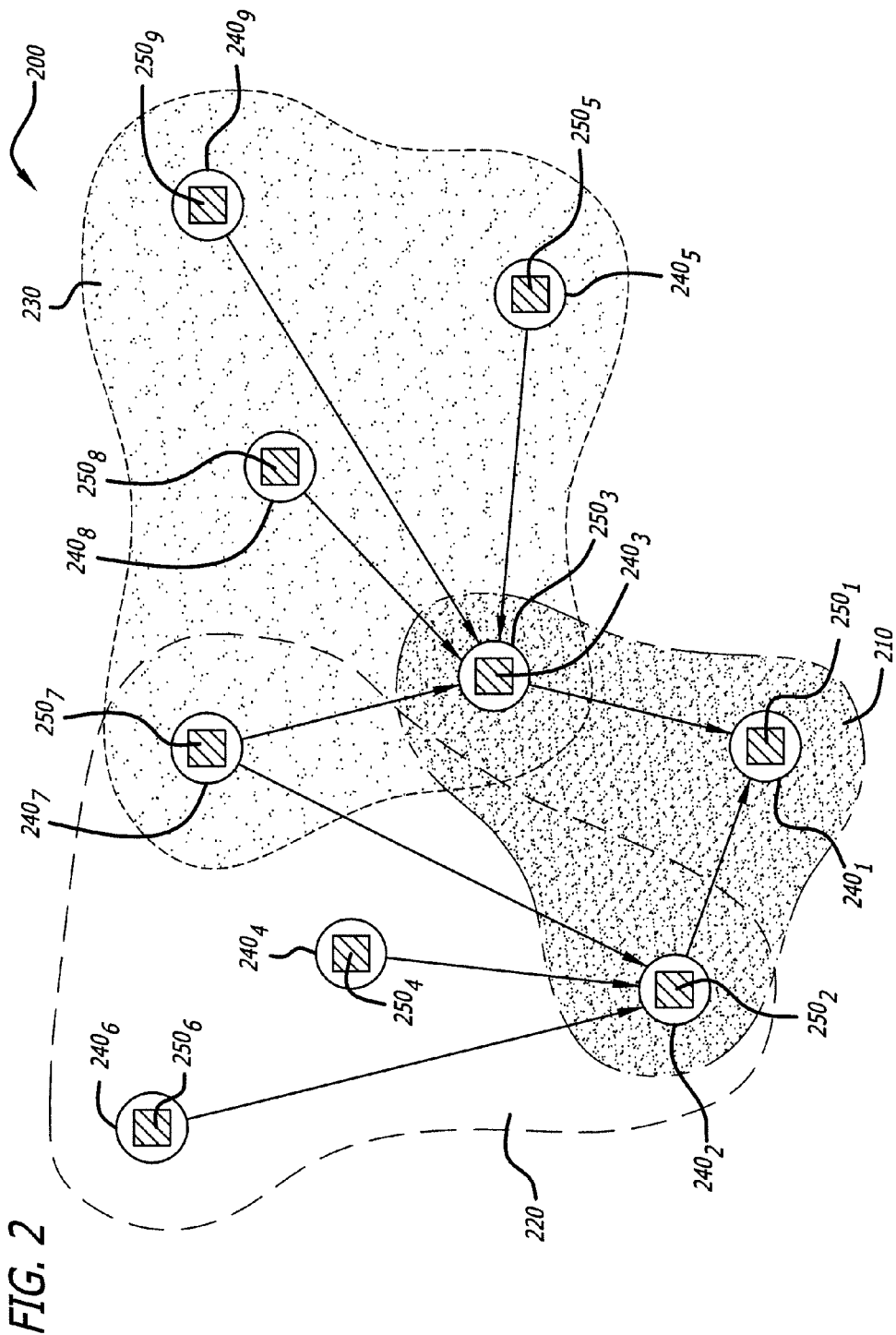
FIG. 2 is a diagram illustrating a discovery of a mesh network topology of a wireless home mesh network, according to one embodiment.

FIG. 2 is a diagram illustrating discovery of a network topology 200 of a WHMN according to one embodiment. The discovered network topology 200 illustrates the connective geometry of the nodes in the WHMN 100, as determined by a predefined display node $240_1$. The connective geometry of network topology 200 may include three rings: ring 1 210, ring 2 220 and ring 3 230 encompassing nodes $240_j$ where j=1, . . . , 9. The nodes $240_j$ are the nodes in the mesh network as described in FIG. 1; they are connected via wireless connectivity. The use of three rings and nine nodes is only for illustrative purposes. It is contemplated that the topology 200 may include more or less than the above rings and nodes.

Each of the three rings 210, 220, and 230 includes a ring center node and nodes in the network that are neighbor nodes, as seen or recognized by the ring center node. In one embodiment, a ring center node is a display node. The ring center node does not have to be at the exact geometrical center of the corresponding ring. A node that is a neighbor node of a ring center node (in a ring) may be the ring center node of another ring. In addition, a node may be a neighbor node of more than one ring center node. For example, the ring center nodes for the three rings 210, 220, and 230 are nodes $240_1$, $240_2$, and $240_3$, respectively. For ring 210, the neighbor nodes of the ring center node $240_1$ include nodes $240_2$ and $240_3$. For ring 220, the neighbor nodes of the ring center node $240_2$ include nodes $240_4$, $240_6$ and $240_7$. For ring 230, the neighbor nodes of the ring center node $240_3$ include nodes $240_5$, $240_7$, $240_8$, and $240_9$.

Each of the nodes $240_j$ (j=1, ..., 9) may include a local topology collector $250_j$. For brevity, a node $240_j$ or a node topology collector $250_j$ may be referred to as 240 or 250, respectively, without the subscript. The node topology collector $250_j$ performs node (local) connectivity information collection for the node $240j$. The information collection includes collecting the node connectivity (direct neighbor) information regarding the nodes, as well as detailed node information, which is provided to a display node to compile a mesh (global) network topology. With respect to the node $240_j$, the components of the node $240j$ may be referred to as local components and a node $240_k$ (where k≠j) may be referred to as a remote node.

In one embodiment, the local topology collector $250_j$ may provide application program interface (API) calls for other stand-alone mesh tools such as a mesh visualizer. In one embodiment, a mesh visualizer system includes one display node that runs the visualizer engine, and the remaining nodes send their data to the display node. Whenever a node comes online and joins the WHMN, the node sends unicast mesh packets to the predefined display node. In one embodiment, the raw mesh packet has information including the node's routing table, node name, its MAC address, and its recently-assigned IP address (by mesh AutoIP or a DHCP server if a gateway node is available). The display node receives the node topology packet. The visualizer's parser engine picks up these packets and processes them to extract local connectivity information about each node which is then compiled to form a global network (mesh) topology map that is displayed by the display engine. Alternatively, the information can be stored to a log file for offline processing.

Referring again to FIG. 2, as the topology 200 changes due to network dynamics, traffic, conditions, and/or the dynamics or mobility of the nodes $240_j$, the geometry, pattern, or the membership of the rings may also change. Each of the nodes $240_j$ therefore periodically typically updates its components (local neighbor information) and its view of the network. As a result, the information contained in the nodes $240_j$ reflects a reasonable consistent global view of the network at a reasonable refresh rate that is relevant to its particular needs or applications.

The nodes $240_j$ may participate in the network topology information collection by using a neighbor discovery algorithm to determine a local node topology (connectivity). In one embodiment, local connectivity information is communicated to a display node by employing a node topology message (packet) that is based on unicast transmissions. The use of unicast transmissions avoids flooding the network with node topology messages. Every node $240_j$ is capable of responding to requests sent by any other nodes in the network to request additional node topology information. In addition, any node $240_j$ (referred to as a display node) that needs to query another node is equipped with a query functionality that allows it to send a unicast query to a node in its local route table. Upon receiving a node topology message, the display node may also expand its global topology information to nodes outside its own local route table by analyzing the node topology information from a node topology packet. The topology expansion may be repeatedly performed on nodes that are beyond the current ring of the display node. The frequency, rate, or periodicity of the topology expansion may depend on the application as invoked by the display node and may be fixed or adjustable.

As an example, suppose node $240_1$ is a display node. Nodes $240_2$ and $240_3$ are its neighbor nodes in the ring 210; therefore, they are listed on its local (node) route table. As part of its normal functions in compiling a global network (mesh) topology map, display node 240 may send network query messages to its neighbors. In one embodiment, the display node receives a unicast message from each of the nodes $240_2$ and $240_3$. Nodes $240_2$ and $240_3$ periodically send a unicast message containing updated node topology information to display node $240_1$. It is possible to have more than one node sending queries or requests. In such a case, an existing display node would respond to any node topology message when the message arrives.

In one embodiment, the node topology information is the local route table list of the neighbor nodes. When display node $240_1$ receives the unicast message from, say, node $240_2$, it analyzes the node information of node $240_2$. Display node $240_1$ then discovers that nodes $240_4$, $240_6$, and $240_7$ are the neighbor nodes of node $240_2$, using, for example, the local route table of node $240_2$. Subsequently, when node $240_1$ receives unicast messages from these nodes $240_4$, $240_6$, and $240_7$, it further analyzes the node topology information to discover additional nodes. By periodically receiving the unicast node topology packets, display node $240_1$ eventually expands its global topology information to discover all nodes in the network. The discovery of the global network (mesh) topology moves from ring 210 to ring 220 and expands further until a mesh topology map is compiled from the received node topology packets.

The mesh topology discovery employed by the nodes $240_j$ has a number of advantages. It is a fully distributed protocol that may be initiated by any one or more mesh nodes. It may be viewed as the discovery of a series of expanding rings with the center on the display node to determine a global wireless home network topology. Each new ring represents neighbor nodes in the next (e.g., higher) hop count. It consumes little network resources because the packet sizes are very small and it is not a broadcast-based protocol. Each message is unicast one-to-one to the intended recipients (display nodes), avoiding heavy network traffic and collisions from multiple replies as in a broadcast scheme. Broadcast-based schemes tend to have a higher overhead, and can also encounter issues such as a broadcast storm problem, if duplicate packets are not controlled. The unicast approach renders the topology discovery protocol highly scalable for large scale network deployment.

In one embodiment, a visualizer stores the local topology (connectivity) information of each node and updates the information at run time. Topology discovery starts with the neighbor discovery algorithm to place a display node and its surrounding neighbors on the topology map that is expanded as each new ring of the network is detected. Users can drag and drop nodes on the display to place nodes at appropriate locations on the mesh topology map. In another embodiment, the visualizer system can locally store the data and process it offline in a non-realtime manner. Moreover, the use of the optional cryptographic or other security procedures helps protect the message contents from attacks or modifications, intentional or unintentional.

Figure 3:
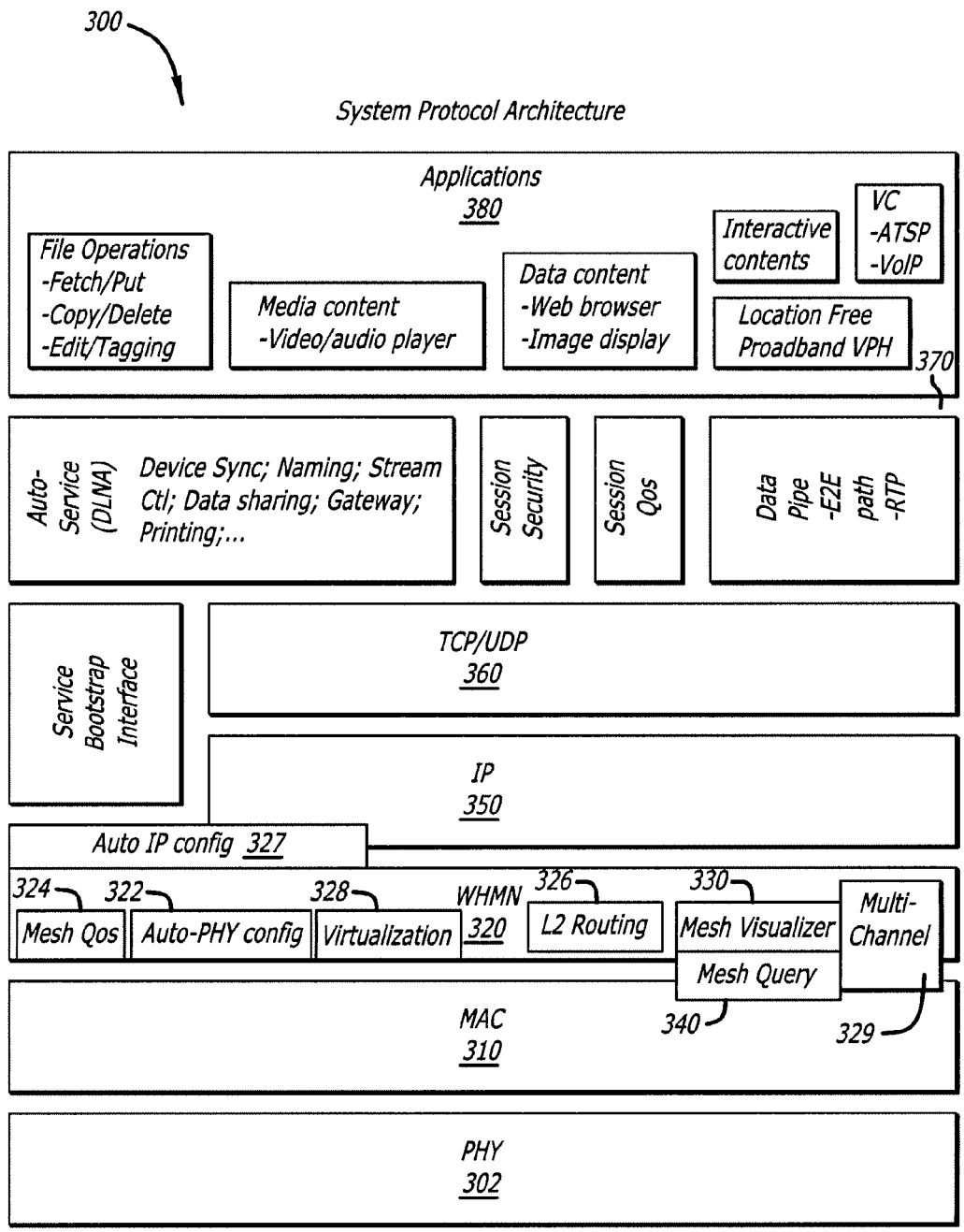
FIG. 3 is a block diagram illustrating wireless ad hoc home network protocol architecture, according to one embodiment.

Referring now to FIG. 3, a block diagram shows one embodiment of an Open Systems Interconnection (OSI) layer representation of the system protocol architecture 300 for a node within home network 100 is shown. This protocol architecture 300 is provided to achieve a self-organizing, self-configuring home network where different functions or features are designed or enhanced to current wireless network architectures built upon TCP/IP/802.11.

To enable wireless home mesh network functions, a single WiFi radio platform may be used. For example, for tier 2 nodes, one IEEE 802.11a/b/g/n, dual-band card (mini PCI, USB dongle, or the like) is used for backhaul links to operate at a 5 GHz band or higher bandwidth. In one embodiment of the invention, links connecting tier 3 nodes are compatible with legacy 802.11b/g mode simply because, at this time, most current mobile nodes support IEEE 802.11b/g WiFi. Of course, the particular wireless PHY and MAC layers may be altered accordingly.

As shown in FIG. 3, in the protocol architecture 300 described, wireless home mesh network ("WHMN") functions 320 are placed between MAC layer 310 and network IP layer 350 to provide a solution that is independent of the higher OSI layers deployed and can be more easily reconfigured. Representatively, in system protocol architecture 300 of FIG. 3, enhanced functionality is placed in WHMN layer 320 between MAC layer 310 and a Network (IP) layer 350. Hence, WHMN layer 320 generally constitutes an "OSI layer 2.5" solution. The placement of WHMN layer 320 provides enhanced functionality that is transparent to both lower and higher OSI layers, and different radio chipsets can be supported. WHMN layer 320 carries key functions for network configuration, including distributed IP address assignment and collision detection as described below.

In one embodiment, WHMN functions layer 320 is transparent to both lower and higher layers, to enable support for different radio chipsets. The WHMN layer 320 can perform functions of WHMN software organization and configuration such as auto-PHY (network discovery) configuration 322, layer 2 routings 326, auto-IP configuration 327, mesh QoS 324, virtualization 328, multi-channel . . . , etc. In one embodiment, each node uses a MAC packet and MAC address for initial topology setup. WHMN layer 320 also includes mesh visualizer 330 and mesh query 340 to collect topology information regarding the wireless home mesh network. The topology information may include local connectivity information of a node, such as the direct neighbors of the node and the neighbors' neighbor information. In one embodiment, the local connectivity information is combined with the received node information to form an interactive global topology map of the wireless home mesh network to display for a user.

As shown in FIG. 3, WHMN layer 320 includes various smart network functions (322-340), according to one embodiment. These smart network functions are placed between (and may overlap with) MAC layer and IP layers 310 and 350. In one embodiment, the mesh visualizer function 330 may provide an interactive mesh topology map where users can access a real-time topology of the network connectivity and detailed information of each node, device, or link. In one embodiment, electronics devices, as referred to herein, describe electronic devices that include a radio NIC from an original equipment manufacturer (OEM). Some sample OEM electronic devices may include Sony® BRAVIA® digital televisions, Sony® Playstation 3® game consoles, Sony® VAIO® computers, or other like Sony® stationary and handheld devices such as smart devices.

In one embodiment, mesh visualizer 330 may compile local (node) connectivity information from each node to form a global network (mesh) topology map of a wireless home mesh network. Topology visualization features within a wireless home mesh network, in one embodiment, are incorporated into an OEM electronics device such as electronics device 400, as shown in FIG. 4.

Figure 4:
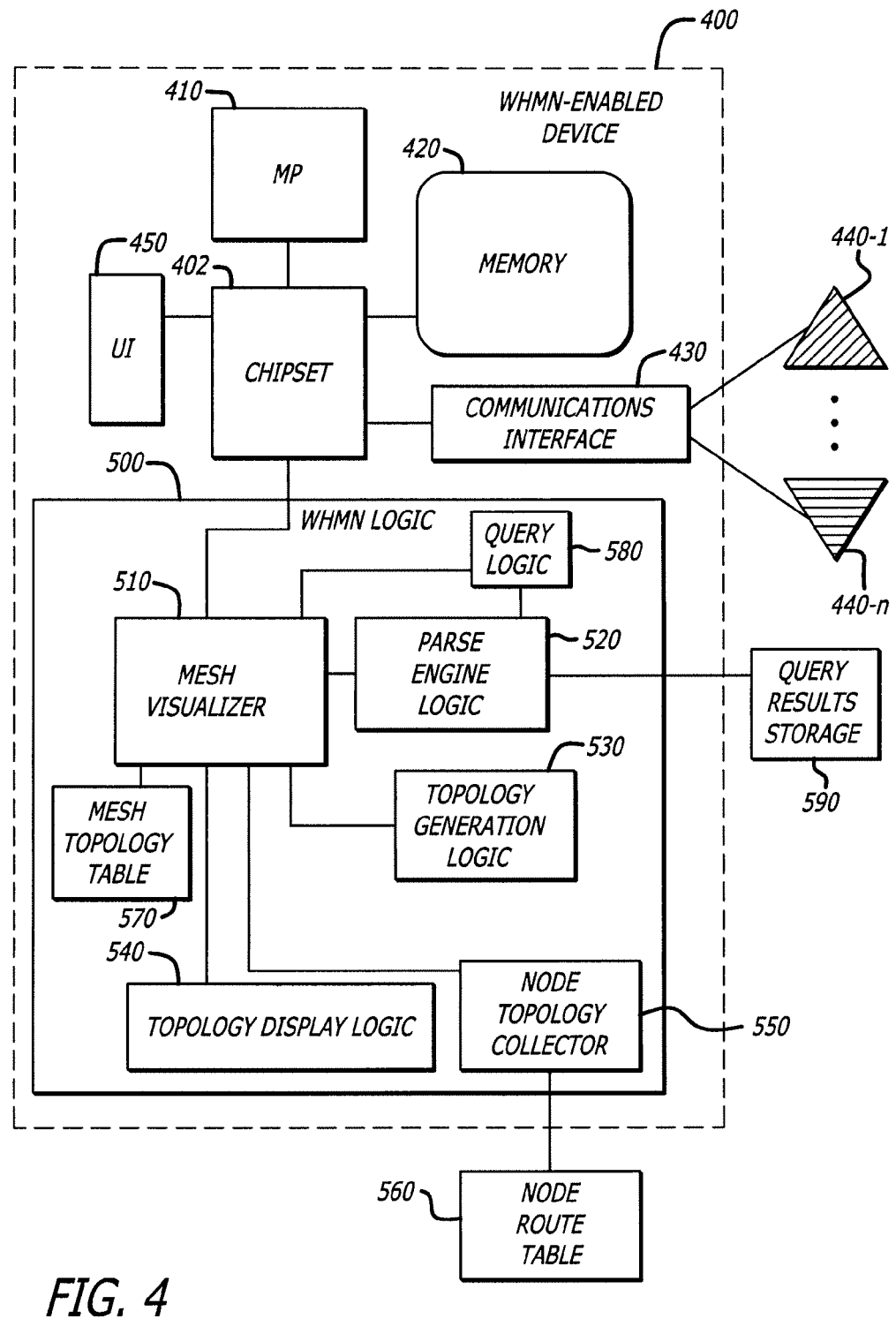
FIG. 4 is a block diagram illustrating a wireless home electronics device configured to implement a wireless home mesh network (WHMN), according to one embodiment.

As illustrated in FIG. 4, a wireless node that is WHMN-enabled, such as an OEM electronics device 400, includes a microprocessor 410 which uses wireless chipset 402 to access memory 420 and communications interface 430. The communications interface may include one or more (N>1) tunable antennas $440_1$-$440_N$. In contrast to conventional electronics devices, device 400 includes wireless ad hoc home network ("WHMN") logic 500. The WHMN logic 500 includes mesh visualizer logic 510. Mesh visualizer logic 510 uses parse engine 520, topology generation logic 530, local topology collector logic 550, and topology display logic 540 to compile local (node) topology information to visualize a topology of a WHMN ("mesh topology map").

As indicated above, the WHMN protocol stack is a cross-layer design where WHMN functions, including initial setup, routing, quality of service, and visualization features, are placed into OSI layers 2 and 2.5, which are below an IP layer (see FIG. 3). As a result, the WHMN protocol may solve connectivity status issues in a multi-hop network that are transparent to any service applications built upon IP.

FIG. 4 illustrates the node topology collector $250_j$ shown in FIG. 2 according to one embodiment. The node topology collector $250_j$ includes a local (node) route table 560 that stores the connectivity (direct neighbors) of the node. In addition, table 560 may store the neighbors' neighbor information.

The collector 550 periodically transmits local (node connectivity) topology information (packet) to a display node. A node topology packet is received by a display node $240_1$ (FIG. 2) in an ad hoc home mesh network. The local connectivity information is associated with the local route table 560. The display node $240_1$ is collecting or gathering details or information on nodes and network topology. The collector 550 may exist in all nodes $240_j$'s (FIG. 2) that are participants in the WHMN to exchange network and node connectivity information; logic blocks 510-540 may be limited to a display node. In one embodiment, the collector 550 may be a module running a daemon program. This daemon program may be started upon boot-up or any appropriate time when the network topology service is started.

Upon receiving a node topology message, the display node $240_1$ may decrypt the node topology message (if the message is encrypted) to obtain the specific local (node) connectivity information. The nodes of the network periodically retrieve the local connectivity information from a local information storage. The local connectivity information storage may include at least one of the capabilities, characteristics, or attributes of the node or the network. These capabilities, characteristics, or attributes may include a node routing table such as the local route table 560, a node neighbor table that includes the list of the neighbor nodes, a node identifier (e.g., the node name), a node address (e.g., the Internet Protocol (IP)/MAC address), a node type including the node tier level, a node network capability (e.g., multi-channel capability or QoS capability/priority), a node service capability (e.g., video, voice, or data streaming), a node power attribute (e.g., battery level), and a node communication attribute (e.g., radio type and link qualities).

As shown in FIG. 4, the node topology collector 550 collects, gathers, and/or receives data, details, and/or information on network, devices, or nodes in the network. The collector 550 includes query logic 580. The collector 550 may include more or less than the above components.

The query logic 580 queries a node $240_k$ listed in the local route table 560 for node information of the node. The query logic 580 may also query a node in the mesh topology table 570. The local route table 560 may contain a list of the neighbor nodes of the node $240_j$. It may also contain the routing information such as the source and destination nodes of a link. The local route table 560 may be updated as the routes change or periodically based on a pre-determined periodicity. The query logic 580 may interact with a cryptographic engine (not shown) to encrypt the query (when necessary). The query logic 580 sends a unicast query message containing the encrypted query to the node $240_k$.

The reply processor 410 processes a reply to the unicast query message from the node $240_k$. The reply includes the node information as requested by the query. The node information may include connectivity information, as well as the capabilities, characteristics, or attributes of the remote node $240_k$ or the network. The remote node $240_k$ returns the node information having the same information except that the node information pertains to the node $250_k$. The reply processor 410 may wait for a reply time-out period. Thereafter, it may receive the reply as sent by the node $240_k$. It may have a buffer or a queue to buffer the reply. When the query logic 580 sends several queries to several nodes, there may be a number of replies returned from these nodes. The reply processor 410 may maintain a reply time-out period for each node that the query logic 580 has sent a query. A reply time-out period helps the reply processor 410 determine if a node is responsive to the query. If the reply time-out period expires and no reply is received, the reply processor 410 may inform the query logic 580 to re-send the query to that node. When the reply processor 410 receives the reply, it may decrypt the reply if the reply is encrypted using the established cryptographic procedure. From the decrypted reply, the reply processor 410 then extracts the node information of the node $250_k$.

The query logic 580 may expand querying to another remote node $240_m$ in the ad hoc network using the node information of the $240_k$. This new node $240_m$ may be a neighbor of the node $240_k$ and may not be listed in the local route table 560. If this new node is also a neighbor of node $240_j$ and therefore is listed in the local route table 560, it should have been previously queried by the query logic 580 and therefore is not queried again.

The query logic 580 analyzes the node information (as extracted by the reply processor 410) to obtain the neighbor connectivity information of the remote node $240_k$. For example, it may scan the list of the list of the neighbor nodes of the remote node $240_k$ and obtain their connectivity status, their name, and/or address. Using the neighbor connectivity information of the remote node $240_k$, the query logic 580 may build a mesh topology table 570. The mesh topology table 570 contains connectivity information on the network nodes and the network as viewed by the node $240_j$. It may be implemented using any suitable structures such as static arrays or linked list. In one embodiment, mesh topology table 570 is a trace file that is processed by topology display logic to draw an interactive topology map of a home mesh network.

In one embodiment, during building of the mesh topology table 570, the query logic 580 may organize the analyzed node information into proper sets and/or subsets, re-arrange the list of the nodes that have been queried or to be queried, resolve any redundancies or conflicts. In one embodiment, this information is stored within query results storage 590 for off-line processing. In one embodiment, the query logic 580 may identify the node $240_m$ as not receiving a duplicate query, such as having been previously queried or about to be queried by the query logic 580, to avoid sending a duplicate query. The query logic 580 then sends a next query to the node $240_m$ based on the mesh topology table 570. The query logic 580 may expand querying to the node $240_m$ or any other nodes in the mesh topology table 570 at a periodicity according to an application that the node $240_j$ invokes, or based on a pre-determined frequency as established by the network conditions and/or the query mesh protocol. The mesh topology table 570 may also provide information on the expanded list of the nodes to the query logic 580 so that the query logic 580 may send out a query. With appropriate flag settings and stopping criteria, a recursive query module may be developed.

As shown in FIG. 4, in one embodiment, when wireless node 400 is powered on, WHMN logic 500 may scan each channel to detect the presence of other networks. For example, activation of electronics device 400 may trigger the WHMN logic 500 to issue one or more 802.11 ad hoc functions to scan each wireless channel to determine a list of available wireless networks. Based on the detected beacons, logic 500 may identify one or more wireless networks that are operating in an ad hoc mode. The WHMN logic 500 may transmit one or more security parameters to enable a node within a WHMN to verify the electronics device 400 as an electronics device from a same OEM. However, a WHMN-enable device may also be a node of a WHMN, as described herein.

For example, referring again to FIG. 1, digital television (DTV) 130 may initially become a first stationary node for home network 100 of FIG. 1. According to such an embodiment, DTV 130 will include a radio NIC which will periodically emit a beacon to enable identification of home network 100 by any newly-added consumer electronics devices. For example, desktop computer 150, upon activation, may detect the presence of home network 100 based on a response received from DTV 130 in response to a connection request message.

Referring to FIG. 4, an exemplary embodiment of tier-2 node 130 (FIG. 1) is shown. Herein, tier-2 node 400 comprises an embedded wireless network chipset 402 that includes one or more processors 410, memory 420, a communications interface 430, and a user interface (UI) 450. According to this embodiment, processor(s) 410 are adapted to initiate and process network query messages and node topology messages to establish a global topology map of home network 100 of FIG. 1, as well as to provide a mesh query protocol to collect node connectivity information for each node that has joined home network 100. These messages are transmitted and received over communications interface 430, which may include one or more antennas $440_1$-$440_N$ ($N \geq 1$) that are controlled by processor 410 or dedicated circuitry (not shown) to tune to receive incoming wireless signals on a particular channel and to transmit outgoing wireless signals to other nodes over that particular channel.

Referring back to FIG. 1, prior to communicating data, tier-2 node 130 associates with another node that is already part of home network 100. After an association is established, tier-2 node 130 and another tier-2 node 150 can exchange data. The association process is a two step process involving three states: (1) unauthenticated and unassociated; (2) authenticated and unassociated; and (3) authenticated and associated. To transition between the states, the communicating parties exchange messages called management frames. In operation, all nodes are adapted to transmit one or more management frames, referred to as Neighbor Discovery Request messages, to determine if there are any nodes that can decode the message and respond in a timely manner.

Before conducting operations to associate (join) home network 100, tier-2 node 130 listens for response messages to a Neighbor Discovery message (see FIGS. 5 and 6) in order to identify what other nodes are within range and in communication over what channel. After identifying node 150, nodes 130 and 150 may perform a mutual authentication by exchanging several management frames as part of the process. After successful authentication, tier-2 node 130 moves into the second state authenticated and unassociated. However, until a node 130 generates a unique IP address within WHMN 100, node 130 is unable to route data within WHMN 100. In one embodiment, the various messages used for topology visualization are organized based on a proprietary format as shown in FIG. 5.

Figure 5:
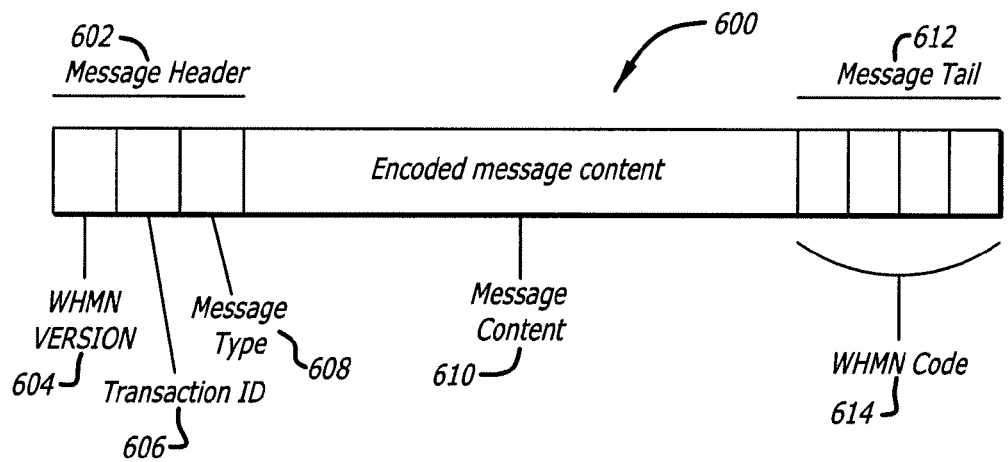
FIG. 5 illustrates a generic WHMN message packet format according to one embodiment.

FIG. 5 illustrates an exemplary format of a WHMN message 600 which is representative of a messaging format that node 400 of FIG. 4 uses for initial WHMN setup. For example, during the discovery phase where nodes analyze their wireless environment, each new wireless node may run the discovery scan to all wireless networks detected in its neighborhood. The new node then transmits a Discovery message (as a broadcast or multicast) to all identified wireless ad hoc home mesh networks to identify a WHMN in its neighborhood. Existing nodes of a WHMN respond to the Discovery message with appropriate details necessary to establish a new connection. The device discovery and a WHMN authentication process are further described in co-pending application Ser. Nos. 12/360,771.

More specifically, as shown in FIG. 5 as an illustrative embodiment, WHMN message 600 may include (i) a message header 602, (ii) message content 610, and (iii) a message tail 612. Herein, according to this exemplary embodiment, message header 602 includes a WHMN version 604, a transaction (message) ID 606 that identifies the particular message, and a type parameter 608 that indicates a type of node transmitting the message (e.g., tier 1, tier 2 or tier 3). Message content 610 may include encoded data that is used to protect the data from interlopers and to ensure that the data is accessible only by the targeted wireless node. Message tail 612 includes a WHMN code 614. In one embodiment of the invention, each WHMN message ends with a repeated WHMN code 614 that may be repeated a predetermined number of times to ensure that an entire message is received without error.

Figure 6:
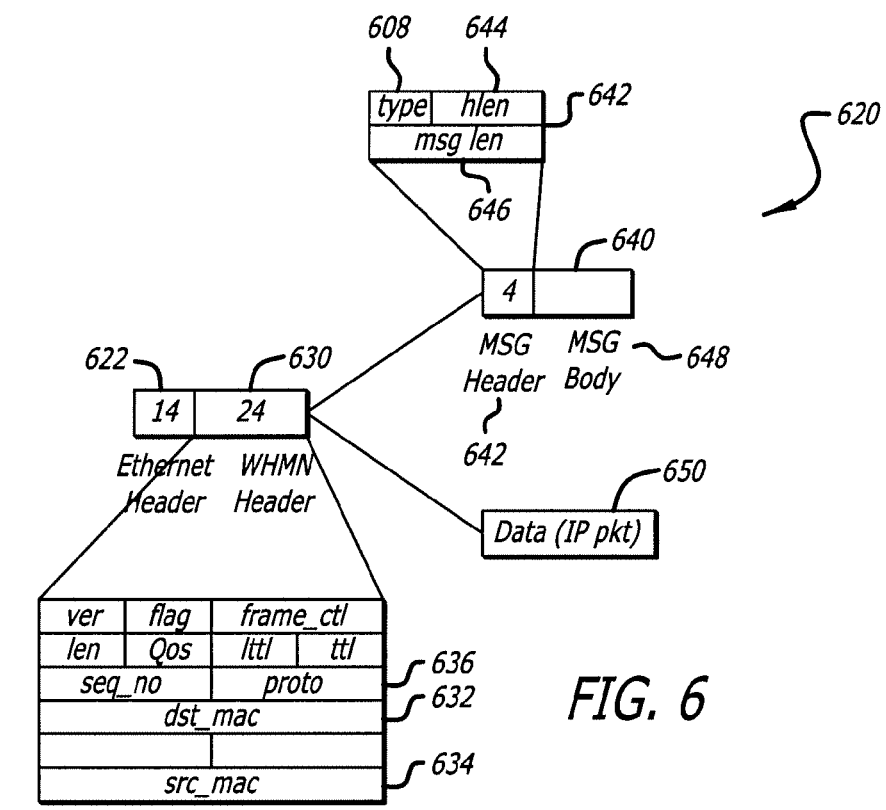
FIG. 6 illustrates an Ethernet packet including a WHMN message packet format according to one embodiment.

As an example, FIG. 6 illustrates exemplary formats of two types of WHMN message 600, namely WHMN data message 650 and WHMN control message 640. Herein, according to this embodiment, both WHMN data message 650 and WHMN control message 640 are routed by encapsulating these messages within an Ethernet packet 620. For example, as shown in FIG. 6, Ethernet packet 620 includes a 24-byte WHMN header 630 that is inserted after an Ethernet header 622. WHMN header 630 includes a destination MAC address 632 to identify a destination for WHMN message 600 and a source MAC address 634 to identify a source of WHMN message 600.

As shown in FIG. 6, other information 636 also may be placed within header 630 including, but not limited to, a protocol version that identifies a version of the system protocol architecture, a control flag, a frame type as being data or control, a frame length, a QoS feature, a Time-to-Live (TTL) value that specifies how long (in hops) the message is allowed to "live" on the network where each hop causes the TTL value to be reduced by one, a sequence number that indicates the sequence of the frame within a complete message transaction, and a data protocol type.

For control messages (e.g. discovery, authentication, routing, topology), 4-byte control header 642 is inserted after header 630, where control header 642 includes type 608, header length 644, and message length 646. After control header 642, a message body (content) 648 of WHMN control message 640 is inserted. For Discovery messages, for instance, content 648 is a "challenge text" as described below.

For WHMN data messages 650, however, an IP data packet received from the OSI network layer is attached to Ethernet packet 620 after WHMN header 630 in lieu of control header 642 and content 648 to form a WHMN data message 650. Procedural methods for implementing one or more embodiments are now described.

Operation

Figure 7:
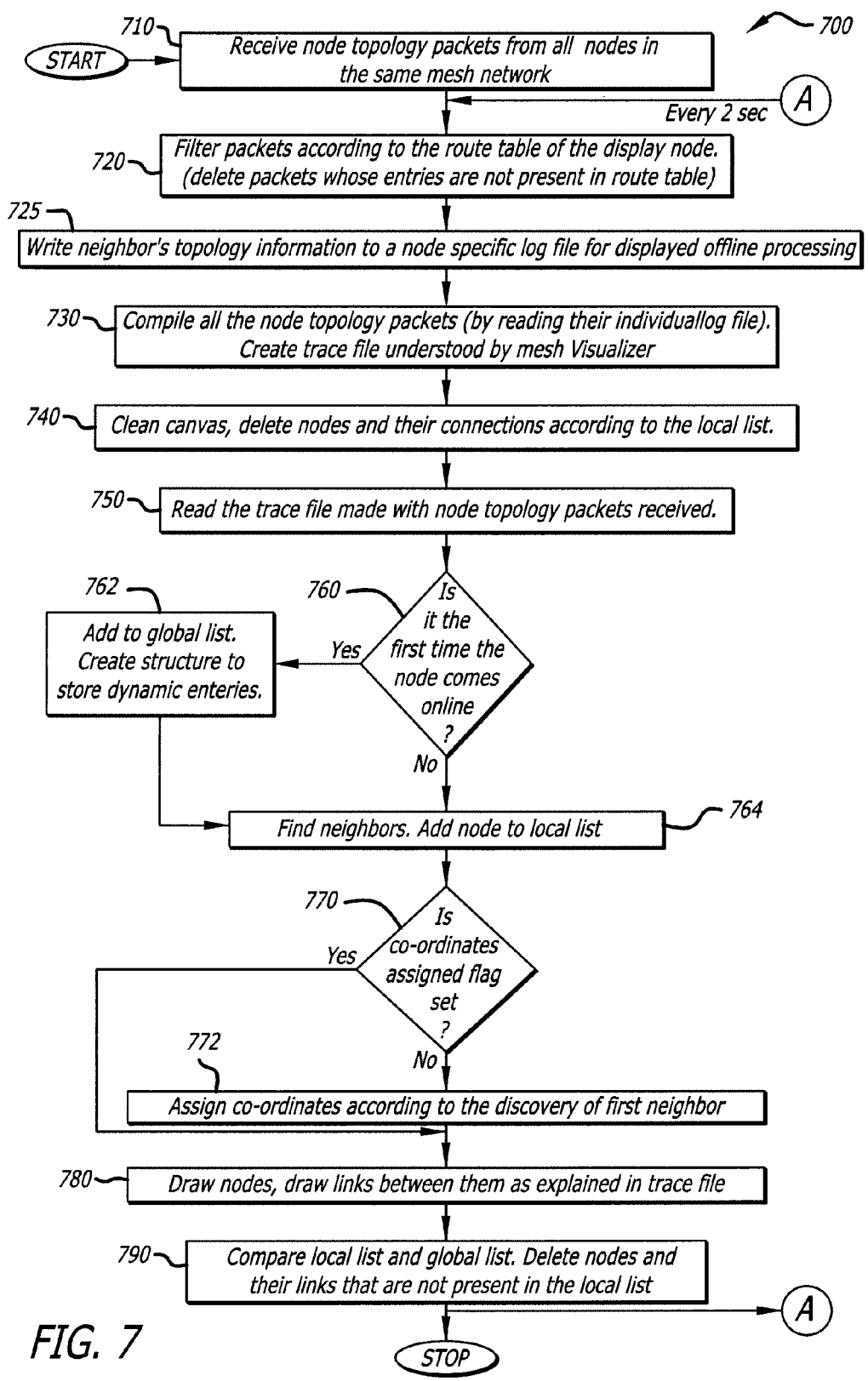
FIG. 7 is a flow chart illustrating a method for network topology visualization, according to one embodiment.

FIG. 7 is a flow chart illustrating a method 700 for network topology visualization of a multi-hop wireless home mesh network, according to one embodiment. The mesh visualization service may be performed within a wireless home mesh network (WHMN), for example, as depicted in FIG. 1, utilizing an OEM/WHMN-enabled electronics device as described in FIG. 4, in accordance with one embodiment.

In the embodiments described, the visualizer may compile node connectivity information received from the various mesh nodes of a wireless home mesh network, for example, as shown in FIGS. 1 and 2. To provide topology visualization, in one embodiment the system includes one display node that runs a visualization engine (e.g. mesh visualizer 510 of FIG. 4), while the remaining nodes send local (node) connectivity data to the display node. As described herein, node connectivity information may refer to the direct neighbors of a node as well as the neighbors' direct neighbors.

During initialization, a mesh node determines neighbor information and places the various neighbors, as well as their assigned IP addresses, within a local (node) route table. In one embodiment, when a mesh node comes online and joins a mesh network, the node starts sending unicast mesh packets through, for example, an Ethernet raw socket to a predefined display node. The raw mesh packet has information (node connectivity information) including, but not limited to, the node's routing table, the node name, MAC address, and recently-assigned IP address.

Referring again to FIG. 7, at process block 710, it is determined whether a node topology packet has been received from each node of a wireless home mesh network. As described herein, a node topology packet may refer to a message that includes the local neighbors of a mesh node. At process block 720, the node topology packets are filtered according to a route table of the display node. In one embodiment, packets whose entries are not present in a route table of the display node are deleted. At process block 725, the remaining neighbor information is stored to separate files for each neighbor. This file can later be used for offline processing or in run-time by the parser engine for display by the mesh visualizer system. At process block 730, each of the node topology packets is read to create a trace file (see mesh topology table 570 of FIG. 4) that is read by a mesh visualizer tool. In one embodiment, node connectivity information (such as the local neighbors of a node) is compiled as node topology packets are received from each node of a WHMN. Based on this information, the local connectivity information is compiled to form a global network (mesh) topology map of the network.

One embodiment displays an interactive mesh topology map. At process block 740, a display window may be reset while nodes and connections are deleted according to a local list. For example, in one embodiment, a display node may initiate a neighbor discovery algorithm and place itself, as well as surrounding neighbors, on a mesh topology map. This mesh topology map is gradually increased as further neighbors of the display node, as well as remote nodes, are added to the topology. In one embodiment, mesh topology information is written to a trace file.

At process block 750, the trace file may be read to form a mesh topology map or graph of the network. At process block 760, it may be determined whether a detected node was detected for the first time. When such a node is detected for the first time, the node may be added to a global list (mesh topology table) of the display node. At process block 764, the neighbors for the current node may be determined and added to a local list (node route table) of the display node. At process block 770, it is determined whether a coordinate's flag is assigned. Although described with reference to a coordinate's flag, process block 770 may refer to new nodes which require assignment of coordinates to enable display on a display screen such as a user interface. Accordingly, for new nodes, at process block 772, coordinates are assigned to the new node according to the discovery of a first neighbor for the node. These coordinates could later change if the user decides to drag the node to a different location on the topology map. At process block 780, a mesh topology map may be written to a display screen by drawing links between the nodes according to a trace file. Finally, at process block 790, the local list may be compared to the global list; nodes that are not present in the local list are deleted. As shown, this process may repeat to handle situations where the global network topology is varied.

Figure 8:
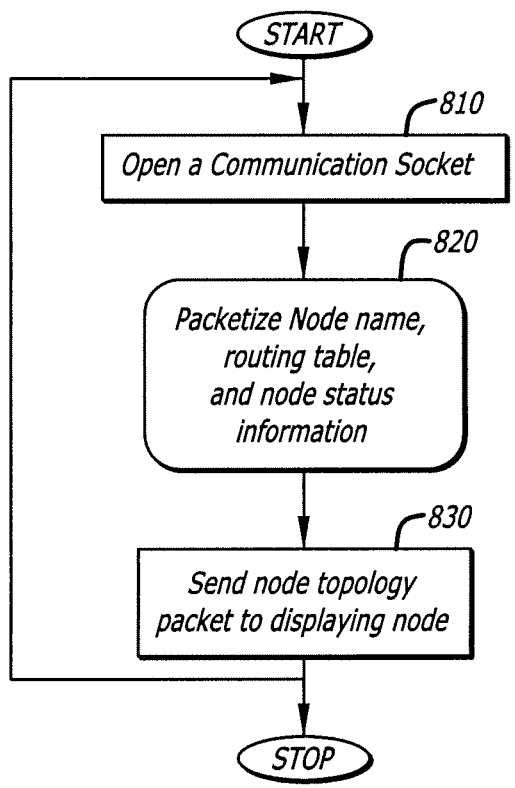
FIG. 8 is a flow chart illustrating node topology packet generation, according to one embodiment.

FIG. 8 is a flow chart illustrating a method 800 for the collection of node topology information and packaging of the information within a node topology packet that is transmitted to a predefined display node. At process block 810, a communication socket is opened. At process block 820, the mesh node may packetize a MAC address, a node name, its routing table, and other information (including node capabilities, type of node, number of active flows, etc.) in a packet. Finally, at process block 830, the node topology packet is sent to the display node. Although the communication of node topology packets is often repeated, the size of such packets is generally very small, and therefore consumes a small percentage of the overall network bandwidth.

Referring again to FIG. 1, the various links between tier 2 nodes, such as flat-panel TVs 130, 131, and 132, gaming console 140, and desktop computer 150 may provide a backhaul 170 of the network 100. As indicated above, this backhaul of the network may route, for example, high definition (HD) video content to provide a television-centric network. In a television-centric network, content stored, for example, on TV 130 may be routed within network 100 and displayed on any of TVs 131-132, and/or provided to desktop computer 150 or gaming console 140. Hence, regardless of the location within the WHMN 100, content may be routed to any desired tier 2 device.

Furthermore, access to external networks via tier 1 devices 110-111, such as gateway node 120, is provided. For example, a user in the back yard using laptop computer 166 may establish a link with gaming console 140 to join WHMN 100. Based on joining of the network, this user may access gateway node 120 via a multi-hop path including game console 140, digital television 132, desktop computer 150, and backhaul link 170.

In addition to network extension capabilities, WHMN 100 may enable access from various tier 3 devices including handheld video recorder 162, music player 168, or the like, to stream content from such devices throughout the network. In addition, tier 3 devices (160-169) can load content within, for example, a music player 168 which is outside of WHMN 100. In the embodiments described, the various tier 2 or 3 devices may be from the same OEM, such as Sony® Electronics. However, other non-OEM devices may be enabled for joining and accessing WHMN 100. Accordingly, such devices, once activated, will automatically form a wireless ad hoc home mesh network with minimal user interaction beyond selection of desired networks, creation of additional networks, or password information for network authentication.

Alternate Embodiments

Several aspects of one implementation of the wireless ad hoc home network for providing improved home electronic device connectivity are described. However, various implementations of the wireless ad hoc home network provide numerous features including, complementing, supplementing, and/or replacing the features described above. Features can be implemented as part of the access point or as part of the wireless devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. An apparatus comprising:
   at least one processor;
   at least one computer readable medium accessible to the processor to configure the processor for:
   exchanging one or more messages to discover a topology of a wireless home mesh network including mobile nodes and at least one stationary node;
   determining whether a node topology packet has been received from each node of the wireless home mesh network, a node topology packet including local neighbors of a mesh node sending the node topology packet;
   filtering the node topology packets according to a route table of a display node, node topology packets whose entries are not present in the route table of the display node being deleted;
   using each of the node topology packets to create a visualizer file readable by a mesh visualizer tool, node connectivity information including local neighbors of a node being compiled as node topology packets are received from each node of the network to establish a global network topology map of the network;

presenting an interactive mesh topology map based on the global network topology map, a display window being reset while nodes and connections are deleted according to a local list, the mesh topology map being gradually increased as further neighbors of the display node, as well as remote nodes, are added to network topology;

determining whether a detected node is detected for a first time; and responsive to detecting a detected node for the first time, assigning coordinates to the detected node according to the discovery of a first neighbor for the detected node.

2. The apparatus of claim 1, wherein the apparatus comprises one of a mobile electronics device, a gaming console, and a digital television.

3. The apparatus of claim 1, wherein the message of the one or more messages includes a node topology packet including the local route table for one of the mobile nodes.

4. The apparatus of claim 1, wherein the message of the one or more messages includes a node name and a node address being one of an Internet Protocol Address or a Media Access Control address.

5. The apparatus of claim 1, wherein the message of the one or more messages includes a node network capability that includes quality-of-service priority for one of the mobile nodes.

6. The apparatus of claim 1, wherein the message of the one or more messages includes a node service capability that identifies if one of the mobile nodes supports video, voice or data streaming.

7. The apparatus of claim 1, wherein the message of the one or more messages includes a node power attribute that identifies a battery level for one of the mobile nodes.

8. The apparatus of claim 1, wherein the message of the one or more messages includes a node communication attribute that identifies a radio type for one of the mobile nodes.

9. The apparatus of claim 1, wherein the message of the one or more messages includes a node type that identifies a tier level of a mobile node of the mobile nodes that provided the message.

10. The apparatus of claim 1, wherein the instructions when executed by the processor configure the processor to detect a selection by an input device of a node on the network topology map presented on the display, and display additional information regarding the node responsive to the selection.

11. The apparatus of claim 1, wherein the instructions when executed by the processor configure the processor receive from user input a drag and drop of a node on the map from a first location on the map to a second location on the map.

12. An apparatus comprising:
at least one processor;
at least one computer readable medium accessible to the processor to configure the processor for:
exchanging one or more messages to discover a topology of a wireless home mesh network including mobile nodes and at least one stationary node;
determining whether a node topology packet has been received from each node of the wireless home mesh network, a node topology packet including local neighbors of a mesh node sending the node topology packet;
filtering the node topology packets according to a route table of a display node, node topology packets whose entries are not present in the route table of the display node being deleted;
using each of the node topology packets to create a visualizer file readable by a mesh visualizer tool, node connectivity information including local neighbors of a node being compiled as node topology packets are received from each node of the network to establish a global network topology map of the network;
presenting an interactive mesh topology map based on the global network topology map, a display window being reset while nodes and connections are deleted according to a local list, the mesh topology map being gradually increased as further neighbors of the display node, as well as remote nodes, are added to network topology;
determining whether a detected node is detected for a first time; and
responsive to detecting a detected node for the first time, assigning coordinates to the detected node according to the discovery of a first neighbor for the detected node.

13. The apparatus of claim 12, wherein the message includes a node topology packet including a local route table for the first node.

14. The apparatus of claim 12, wherein the message includes a node name and a node address being one of an Internet Protocol Address or a Media Access Control address.

15. The apparatus of claim 12, wherein the message includes a node network capability that includes quality-of-service priority for the first node.

16. The apparatus of claim 12, wherein the message includes a node service capability that identifies if the first node supports video, voice or data streaming.

17. The apparatus of claim 12, wherein the message includes a node power attribute that identifies a battery level for the first nodes.

18. The apparatus of claim 12, wherein the message includes a node communication attribute that identifies a radio type for the first node.

19. The apparatus of claim 12, wherein the instructions when executed by the processor configure the processor to detect a selection by an input device of a node on the network topology map presented on the display, and display additional information regarding the node responsive to the selection.

* * * * *